United States Patent
Spielberg (10) Patent No.: US 8,736,710 B2
(45) Date of Patent: May 27, 2014

(54) AUTOMATIC EXPOSURE CONTROL FOR FLASH PHOTOGRAPHY

(75) Inventor: Anthony C. Spielberg, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 181 days.

(21) Appl. No.: 13/479,950

(22) Filed: May 24, 2012

(65) Prior Publication Data

US 2013/0314565 A1 Nov. 28, 2013

(51) Int. Cl.
*H04N 9/73* (2006.01)
*H04N 5/228* (2006.01)
*H04N 5/222* (2006.01)
*G03B 15/03* (2006.01)
*G03B 15/06* (2006.01)

(52) U.S. Cl.
USPC .............. 348/224.1; 348/222.1; 348/370; 348/371; 396/155; 396/164; 396/174; 396/175

(58) Field of Classification Search
None
See application file for complete search history.

(56) References Cited

U.S. PATENT DOCUMENTS

| | | | | |
|---|---|---|---|---|
| 4,384,238 A | * | 5/1983 | Greenwald et al. | 315/151 |
| 4,893,139 A | * | 1/1990 | Alligood et al. | 396/174 |
| 5,136,312 A | * | 8/1992 | Weaver et al. | 396/61 |
| 5,164,759 A | * | 11/1992 | Yasukawa | 396/157 |
| 5,194,885 A | * | 3/1993 | Spencer | 396/61 |
| 5,392,090 A | * | 2/1995 | Stephenson, III | 396/171 |
| 5,717,964 A | * | 2/1998 | Dowe | 396/165 |
| 6,067,422 A | * | 5/2000 | Tokunaga et al. | 396/157 |
| 6,195,127 B1 | | 2/2001 | Sugimoto | |
| 6,363,221 B1 | | 3/2002 | Tokunaga et al. | |
| 6,614,999 B2 | * | 9/2003 | Hagiuda et al. | 396/155 |
| 7,551,797 B2 | | 6/2009 | Dorrell et al. | |
| 7,668,448 B2 | * | 2/2010 | Hayashi et al. | 396/62 |
| 7,715,705 B2 | * | 5/2010 | Yasutomi et al. | 396/174 |
| 7,756,410 B2 | * | 7/2010 | Senba | 396/155 |
| 7,764,880 B2 | | 7/2010 | Hamada | |
| 7,801,438 B2 | | 9/2010 | Khunita | |
| 2002/0015590 A1 | * | 2/2002 | Chen et al. | 396/182 |
| 2002/0168186 A1 | * | 11/2002 | Jeudi | 396/182 |
| 2006/0044422 A1 | * | 3/2006 | Miyazaki | 348/234 |
| 2008/0074536 A1 | * | 3/2008 | Tamura | 348/371 |
| 2009/0073275 A1 | * | 3/2009 | Awazu | 348/222.1 |
| 2010/0284676 A1 | * | 11/2010 | Shintani et al. | 396/175 |

FOREIGN PATENT DOCUMENTS

| | | |
|---|---|---|
| JP | 2000155350 | 6/2000 |
| JP | 2004069995 A | 3/2004 |

* cited by examiner

*Primary Examiner* — Michael Osinski
(74) *Attorney, Agent, or Firm* — Steven L. Bennett (57) ABSTRACT

A photographic flash unit comprises a direct flash unit and a bounce flash unit rotatably connected to the direct flash unit. Status and control lines coupled between a hot shoe and each flash unit enable independent triggering and control of each flash unit. The direct and bounce flash units may be a part of a digital camera adapted to make a first test exposure using direct flash illumination and second test exposure using bounce flash illumination, then computing an attenuation factor for compensating a selected flash exposure parameter by dividing the selected parameter by the attenuation factor. Steps in a method embodiment include making a first test image, making a second test image, selecting regions in the first and second test images, computing an attenuation factor from luminosity values for the first and second test images, and compensating settings for a final bounce flash image by the attenuation factor.

20 Claims, 10 Drawing Sheets

AUTOMATIC EXPOSURE CONTROL FOR FLASH PHOTOGRAPHY

BACKGROUND

The present invention relates generally to flash photography, and more particularly to flash compensation for bounce illumination.

A flash unit outputs a controlled pulse of light in response to a trigger signal received from a camera, another flash unit, or other control device. A flash unit may be mechanically attached to a camera for primary or supplemental illumination of a photographic subject. One or more flash units may be positioned some distance away from the camera in addition to, or alternatively instead of, a flash unit mechanically attached to a camera. Each of the flash units receives a signal from the camera, or optionally from other flash units or control devices, for initiating and terminating light output. Light from the one or more flash units reflects from a photographic subject and the reflected light is collected by a camera lens for forming a photographic image. Controlling the light output from a flash unit, referred to as flash exposure control, and camera settings such as shutter speed, ISO sensitivity, and lens aperture allows a photographic image to be formed in which a range of tonal values from a photographic subject are captured in a corresponding range of tonal values. The range of tonal values in a captured image is generally smaller than the range of tonal values for the photographic subject represented in the image, and may be shifted more toward dark tones or light tones than tonal values for the subject.

A flash unit or a camera may include automatic flash exposure control for setting parameters such as flash duration, number of flashes, and other factors. Flash units with automatic flash exposure control (AFEC) may apply preprogrammed rules for controlling light output, for example by identifying the main subject in a photographic composition, by reducing the influence of very dark or very light regions on a photographic subject, or many other methods. A flash unit with AFEC may perform at least one test flash prior to a flash for making a final photographic image. The test flash may be used to account for surface reflectivity on different parts of the photographic subject and may take into account other parameters that influence flash settings used to make a final captured image. Many different algorithms have been proposed for controlling flash output to achieve different image results. For example, some flash units with AFEC determine an average tonal value for a photographic subject and adjust flash settings to render the average tonal value a predetermined gray level such as "18% gray" in the final captured image. However, if a photographic subject includes a high proportion of relatively dark areas, adjusting the flash output according to an 18% gray average tonal value may cause light areas to be overexposed in the captured image. Conversely, if the photographic subject includes a high proportion of relatively light areas, dark areas may be underexposed in the final image. Subject detail may be lost in underexposed and overexposed areas of a captured image.

A flash unit with AFEC may adjust flash output by accounting for such parameters as camera-to-subject distance, flash-to-subject distance, duration of flash pulses, and camera settings such as ISO sensitivity, lens aperture, and distance. A flash unit may receive distance information from the camera's autofocus system and use the distance information and the inverse square law for light to determine a time duration for a light pulse to be output from the flash unit to form a captured image with selected properties. This method may be applied in direct flash photography, an arrangement of camera, flash, and photographic subject in which the distance traveled by light from the flash to the subject is about the same as the camera-to-subject distance. With direct flash, a light pulse for illuminating the subject follows a path from the flash to the subject and then reflects from the subject to the camera lens, without reflecting from any intermediate surfaces between the flash and the subject. When a photographer using direct flash modifies a composition by changing the camera-to-subject distance, rearranging the photographic subject, changing camera lenses, or other changes, corresponding changes in flash settings may be predicted by using flash guide numbers, camera histograms, and other methods. For direct flash photography, there are known methods for creating a new image having tonal values comparable to a previous image when flash settings or camera settings are changed. Closely related methods permit a photographer to accurately predict new flash settings and camera settings for achieving a selected magnitude of change in captured tonal values for images created with direct flash exposures.

The larger the uncertainty in measured distances, the greater the difficulty flash units with AFEC may have in predicting correct flash settings for achieving a desired range of tonal values in a captured image. For example, in a configuration of a camera, photographic subject, and flash unit referred to as bounce flash, light output from the flash unit reflects ("bounces") from an intermediate surface such as the ceiling in a room or a photographer's "bounce card" before illuminating a photographic subject and then reflecting toward a camera, where reflected light is captured in a photographic image. Some bounce flash units have a flash head that is rotatable relative to the camera or stand to which the flash is attached to permit the flash head to be aimed at a reflecting surface while the camera lens remains pointed at a photographic subject. Bounce flash is sometimes used to diffuse light falling on a photographic subject, creating a softening effect in the final image. Bounce flash may also be used to reposition a shadow or reflection that interferes with a desired aesthetic effect in a photograph.

When a photographic subject is illuminated by bounce flash, the length of the path traveled by light from the flash to the subject, referred to as flash-to-subject distance, may be substantially longer than camera-to-subject distance. Many guidelines have been proposed for predicting how flash settings and camera settings should be adjusted to compensate for illumination changes during bounce flash photography. However, precise compensation of bounce flash settings for a flash unit with AFEC is difficult partly because of the difficulty in measuring flash-to-subject distance, but also for other reasons such as color shifts and reflectivity of the surface from which light is bounced. Inaccurate compensation of bounce flash settings prevents accurate prediction of tonal values in the resulting image. Many photographers resort to "bracketing" flash settings recommended by an AFEC system by taking several photos, each photo representing the result of an incremental adjustment in at least one flash or camera parameter. However, bracketing may be inappropriate, distracting, or impractical depending on the photographic subject and its location. Camera histograms can be used to predict how much a change in flash settings or camera settings will affect a captured image, but it can be very difficult to associate a particular feature of a photographic subject with a particular point on a histogram plot, so predicting a change in the image of that feature can also be very difficult, especially for photographic subjects that comprise multiple tonal values for each feature of the subject. Flash units with AFEC systems which produce acceptable image results in direct flash photography may produce poor image results, for example loss of subject detail in highlight or shadow areas, when the AFEC system is allowed to control flash settings during bounce flash photography.

BRIEF SUMMARY

An example of an apparatus embodiment of the invention includes a direct flash unit, a bounce flash unit rotatably connected to the direct flash unit, a first group of status and control lines for controlling triggering and flash timing for the bounce flash unit, a second group of status and control lines for controlling triggering and flash timing for the direct flash unit, and a hot shoe adapted for attachment to a camera. The first and second groups of status and control lines are electrically connected from each of the direct and bounce flash units to the hot shoe. The example of the apparatus embodiment of the invention further includes a memory adapted for storing bounce flash luminosity factors for each pixel in a bounce flash test image, a memory adapted for storing direct flash luminosity factors for each pixel in a direct flash test image, a memory adapted for storing attenuation factors calculated from the bounce flash luminosity factors and the direct flash luminosity factors, and a central processing unit adapted for calculating the attenuation factors and compensated flash exposure settings.

In another example embodiment, an apparatus comprises a direct flash unit, a bounce flash unit, and a flash controller. The flash controller includes a memory adapted for storing bounce flash luminosity factors for each pixel in a bounce flash test image, a memory adapted for storing direct flash luminosity factors for each pixel in a direct flash test image, a memory adapted for storing attenuation factors calculated from the bounce flash luminosity factors and the direct flash luminosity factors, and a central processing unit adapted for calculating the attenuation factors and compensated flash exposure settings.

In another example embodiment, a method includes the steps of making a first test image using a digital camera, making a second test image using the digital camera, selecting a region in the first test image, and selecting a region in the second test image. The method further comprises the steps of computing a luminosity value for the region in the first test image, computing a luminosity value for the region in the second test image, computing an attenuation factor from the luminosity values for the first and second test images, dividing a selected control setting for a bounce flash unit by the attenuation factor to form a compensated control setting, and making a final bounce flash image using the digital camera and the compensated control setting for the flash unit.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Some embodiments of the invention comprise a flash unit adapted for matching a value of luminosity representing a selected region of an image captured during bounce photography to a value of from luminosities from corresponding regions in a direct flash test image and a bounce flash test image. Some embodiments of the invention comprise a combination of a camera and a flash unit for automatically compensating a bounce flash image from two test images, one test image from a direct flash exposure and one test image from a bounce flash exposure. Other embodiments of the invention comprise steps in a method for compensating bounce flash settings according to results of a direct flash test exposure and a bounce flash test exposure.

Briefly, embodiments of the invention operate by making two test images. A first test image (the "direct flash test image") is made with direct flash illumination using flash exposure settings and camera exposure settings which may be determined by conventional methods, for example AFEC or other methods known to photographers. A second test exposure (the "bounce flash test image") is made with bounce flash illumination using the same flash settings, camera settings, and camera positions relative to the subject as for the first test exposure, but with at least one bounce flash unit aimed to reflect light from a reflecting surface onto the photographic subject. After the second test exposure, the first test exposure may optionally be displayed, a region of the displayed image may optionally be selected, and a value representative of the luminosity of the selected region determined. Next, the second test exposure may optionally be displayed, a region of the displayed image may be selected, and a value representative of the luminosity of the selected region is determined. Regions in the first and second images may optionally be selected without displaying the first image, without displaying the second image, or without displaying either image. Then, a final image is captured with bounce flash illumination using flash settings adjusted by a value referred to as an attenuation factor. The attenuation factor is calculated from the luminosity values for the selected regions in the direct and bounce flash images. In one exemplary embodiment, an attenuation factor is the ratio of the luminosity value determined for the direct flash test image to the luminosity value determined for the bounce flash test image. The final image made with bounce flash illumination settings calculated from the attenuation factor as defined above will have a value of luminosity for the selected image region that matches the value of luminosity from the first test image made with direct flash illumination. In other embodiments, the attenuation factor is calculated by other methods.

Embodiments of the invention are advantageous for accurately predicting tonal values that will appear in a selected region of a photograph to be made with bounce flash illumination from two simple test exposures, without the necessity for bracketing exposures and without the difficulty and uncertainty of trying to relate a selected image feature to points on a camera histogram. Images having visible details in selected highlights or shadows can be made quickly with bounce flash illumination, without trial and error. Method embodiments of the invention may be used with camera equipment capable of controllable direct and bounce flash exposures and capable of accessing and optionally displaying a numerical value corresponding to luminosity for a region selected by a photographer in a photographic image.

Figure 1:
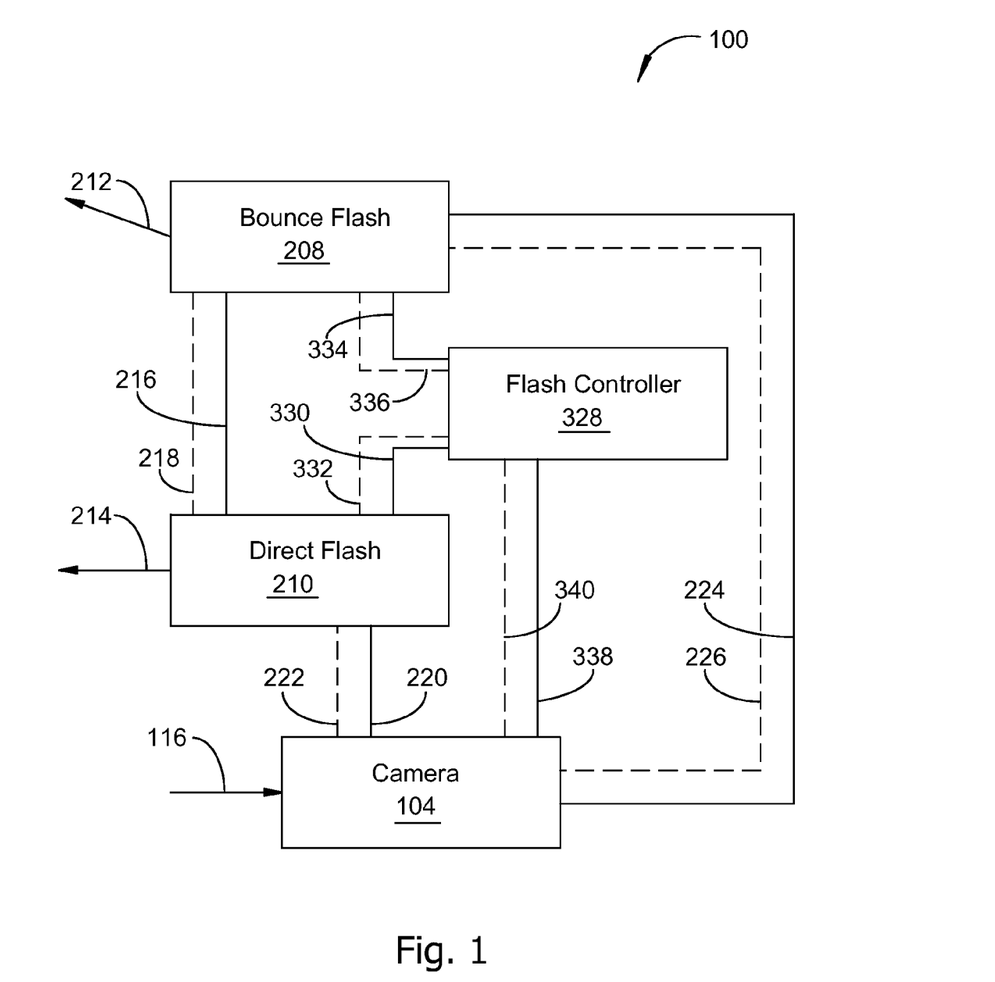
FIG. 1 is a simplified block diagram of an exemplary apparatus embodiment of the invention.

Turning now to the figures, FIG. 1 illustrates an example of a digital photography system in accord with an embodiment of the invention 100. The example of a digital photography system 100 comprises a bounce flash 208, optionally includes a direct flash 210, optionally includes a camera 104, and optionally includes a flash controller 328. The camera 104 forms an image of a photographic subject (not illustrated) from light traveling along a straight-line path 116 from the photographic subject to the camera lens. A camera 104 in accord with an embodiment of the invention 100 is capable of outputting, and optionally displaying, a numerical value corresponding to the luminance of a selected portion of an image captured by the camera, for example by through-the-lens metering capable of reporting luminosity values at image locations selected by the photographer, by a light meter external to the camera that measures luminosity within a region of the photographic subject selected by the photographer (sometimes referred to as "spot metering"), or by the image sensor in a digital camera, in which digital values associated with each pixel are representative of luminosity in that portion of the image corresponding to the pixel's location in the image sensor.

The example of a direct flash 210 of FIG. 1 may output a light pulse along a direct flash path 214 that points directly toward a photographic subject. The direct flash path 214 represents the shortest travel path for light between the direct flash 210 and the photographic subject. Some of the light from the direct flash 210 reflects from the photographic subject and returns to the camera 104 along the path 116 from the subject to the camera lens. In comparison to the direct flash 210, the bounce flash 208 optionally emits a light pulse along a bounce flash path 212 that points toward a reflecting surface (not illustrated). For bounce flash illumination, the bounce flash path 212 and the direct flash path 214 will be in different directions, although a bounce flash 208 may optionally be directed to emit a flash pulse directly at a photographic subject to supplement, or optionally to replace, the direct flash 210.

The camera 104 and flash units (208, 210) may exchange flash triggering signals, optional flash status signals, optional camera status signals, optional flash exposure timing signals, optional flash exposure intensity signals, and optional flash status signals along optional wired connections (solid lines) or optional wireless connections (dashed lines) in FIG. 1. Intensity as used herein refers to an amount of luminous flux per unit of solid angle in light emission from a flash unit. Wireless connections may be implemented to exchange optical, radio frequency, or acoustic signals. For example, the camera 104 may send a trigger signal, flash timing signals, and optionally other signals related to flash control along a wired connection 220 or a wireless connection 222 to direct flash 210. The camera 104 may exchange similar signals along a wired connection 224 or a wireless connection 226 with the bounce flash 208. The bounce flash 208 and direct flash 210 may optionally exchange signals with each other along wired connections 216 or wireless connections 218. The camera 104 may optionally exchange trigger and other signals related to flash control parameters with a flash controller 328 on a wired connection 338 or a wireless connection 340. In some examples of an embodiment of the invention 100, the camera 104 exchanges flash trigger and control signals with a flash controller 328 over wired connections 338 or wireless connections 340. In embodiments of the invention having a flash controller 328, the flash controller and bounce flash 208 may exchange trigger, timing, and other signals such as status signals over a wired connection 334 or a wireless connection 336.

Figure 2:
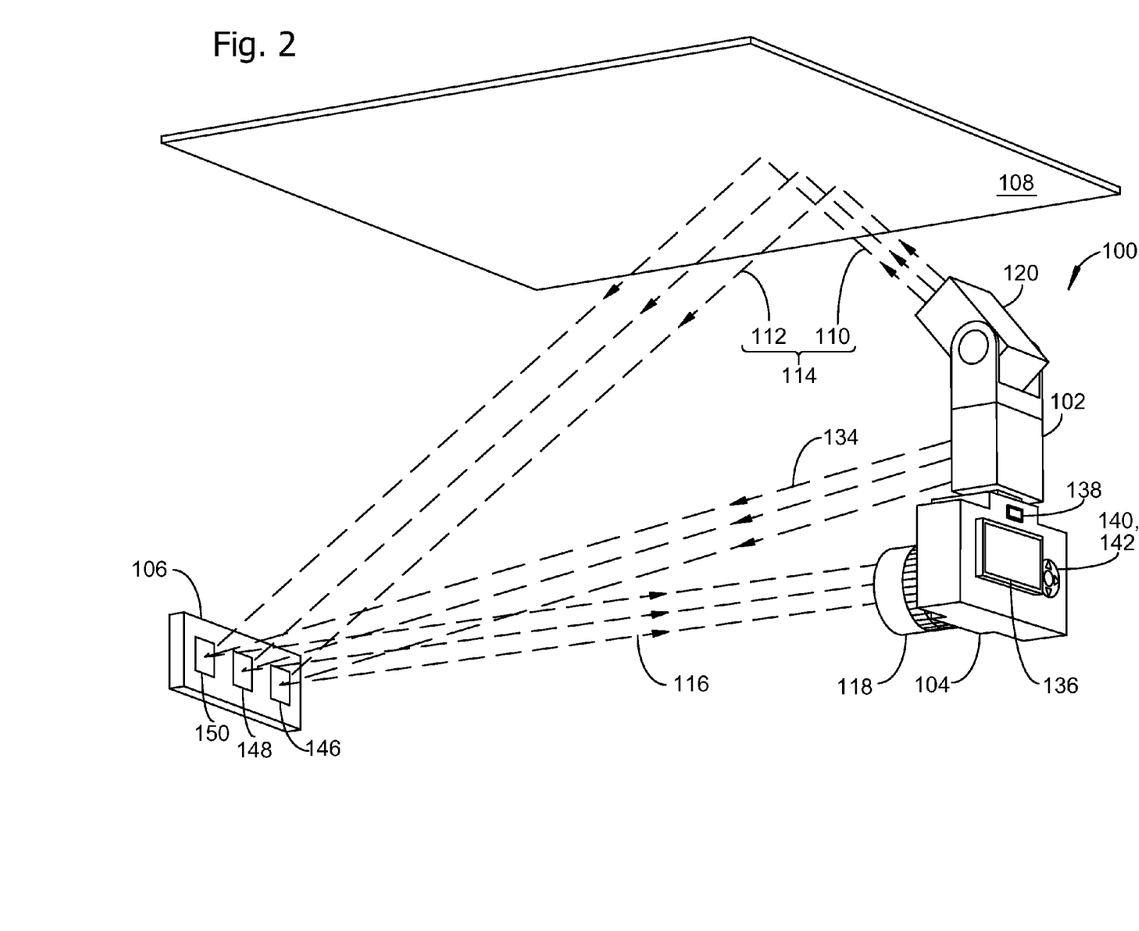
FIG. 2 is a pictorial diagram showing an exemplary embodiment of a camera and bounce flash unit in a configuration for photographing a subject with bounce flash illumination.

FIG. 2 illustrates an exemplary arrangement of an embodiment of the invention 100 and a photographic subject 106 for making bounce flash images with a camera 104 by reflecting light output from the flash unit 102 from a reflecting surface 108 for illuminating the photographic subject 106. The camera is held steady with its lens 118 pointed at the photographic subject 106. The photographic subject 106 is representative of any photographic subject a photographer may choose and includes a plurality of subject features (146, 148, 150). A subject feature may be any visually identifiable feature or region on a photographic subject. Each subject feature (146, 148, 150) comprises at least one tonal value and optionally includes many different tonal values corresponding to different colors, different shades of gray, and different reflectivities. Unless otherwise noted, discussion herein relating to different shades of gray, black, and white applies equally to different colors.

In FIG. 2, the flash unit 102 is mechanically connected to the camera 104. The flash unit 102 may optionally be positioned away from the camera during flash photography. The flash unit 102 includes a bounce flash head 120 for directing light output from the flash unit in a selected direction. In the example illustrated in FIG. 2, the flash head 120 is pointed about 45 degrees away from the direction the camera lens 118 is pointed. A flash unit 102 with a bounce head 120 may be able to rotate the bounce head through an angle greater than 90 degrees relative to the direction in which the camera lens is pointed. Light output from the bounce head 120 is represented by a light path 110 from the bounce head to the reflecting surface 108. Some of the light incident upon the reflecting surface is reflected toward the photographic subject on a light path 112 from the reflecting surface to the subject. The incident light path 110 and the reflected light path 114 for the bounce surface 108 comprise a bounce light path 114. The flash head 120 may be rotated by a photographer to direct light from the bounce flash head 120 toward the photographic subject 106 along a selected bounce path 114. A plurality of lines (110, 112) represent light incident upon the reflecting surface and light incident upon each of the subject features. Light reflected from each of the subject features (146, 148, 150) toward the camera lens 118 is represented by a plurality of lines 116.

Figure 3:
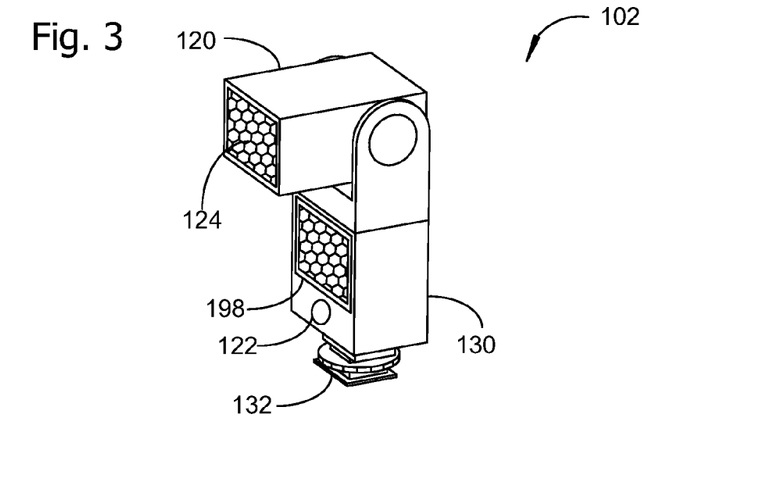
FIG. 3 is a pictorial illustration of an exemplary bounce flash unit in accord with an embodiment of the invention, with the flash head of the flash unit in position for a direct flash exposure.
Figure 4:
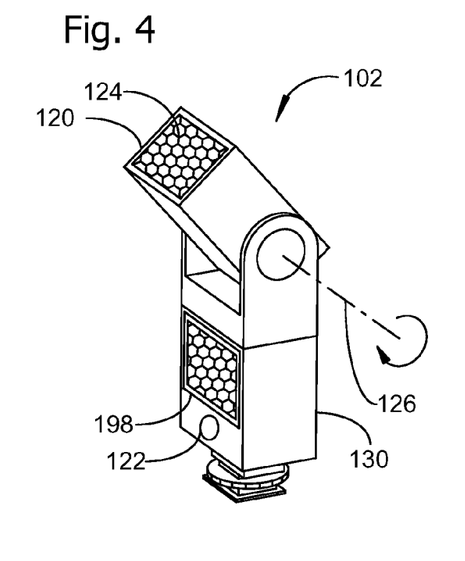
FIG. 4 continues the example of FIG. 3, showing the bounce head on the bounce flash unit turned clockwise around a bounce rotation axis for a bounce flash exposure.
Figure 5:
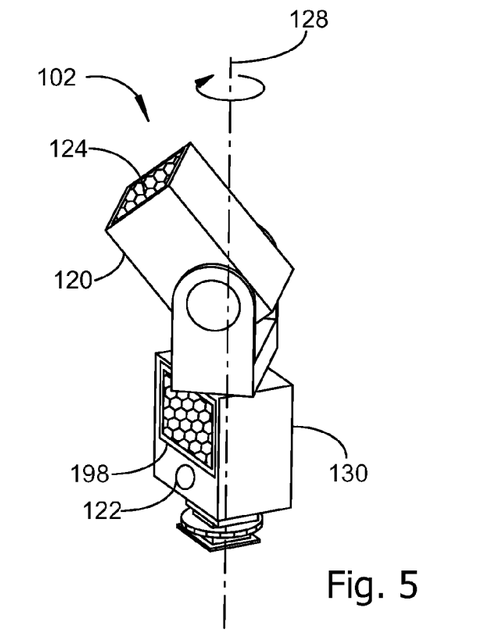
FIG. 5 continues the example of FIG. 3 and FIG. 4, showing the bounce head on the bounce flash unit turned clockwise around the bounce rotation axis and turned clockwise around a bounce swivel axis for a bounce flash exposure.

The flash unit 102 optionally includes a direct flash unit in addition to the flash head 120. A plurality of lines 134 in FIG. 2 from the flash unit 102 to the subject 106 represent direct light paths from the direct flash unit to each of the subject features (146, 148, 150). An exemplary embodiment of the invention comprising a flash unit 102 with a bounce flash unit and a direct flash unit is illustrated in FIGS. 3-5. In FIG. 3, a bounce flash unit 102 includes a bounce flash head 120 rotatably coupled to a flash body 130. The bounce flash head 120 includes an output window 124, or alternatively an output lens 124, through which light from a flash lamp (not illustrated) in the bounce flash head is emitted. The bounce flash unit 102 optionally includes a light sensor 122. The light sensor 122 may optionally be part of a system incorporated into the flash unit 102 for measuring flash-to-subject distance. Flash trigger signals from a camera, flash synchronizer, flash controller, or other flash units may be received through a connector 132.

Continuing with FIG. 3, a direct flash unit 198 may optionally be installed in the flash body 130. The direct flash unit 198 and bounce flash unit 120 are controllable independently of one another, that is, each one may be triggered independently of the other and each may have its own settings for flash pulse timing and intensity. A guide number for the bounce flash unit may be different from a guide number for the direct flash unit. A connector 132, also referred to as a hot shoe, is adapted for mechanical and electrical connection to a corresponding hot shoe connector on a camera. When the flash unit 102 is mechanically attached to a camera by the connector 132, the direct flash unit 198 points in the same direction as the camera's lens. The bounce flash head 120 may be rotated about a bounce rotation axis 126 as shown for the flash unit 102 in FIG. 4. The bounce flash head may optionally be rotatable about a swivel rotation axis 128 as shown for the flash unit 102 in FIG. 5. In FIG. 3, the bounce flash head 120 and direct flash unit 198 are pointed in the same direction for making a direct flash image. Either one or both of the flash units in the bounce flash 102 in FIG. 3 may be used for making a direct flash image. In FIGS. 4-5, the direct flash unit 198 is in position for making a direct flash image and the bounce flash head 120 is shown pointing in two different directions compared to the direct flash unit, for making bounce flash images.

Figure 6:
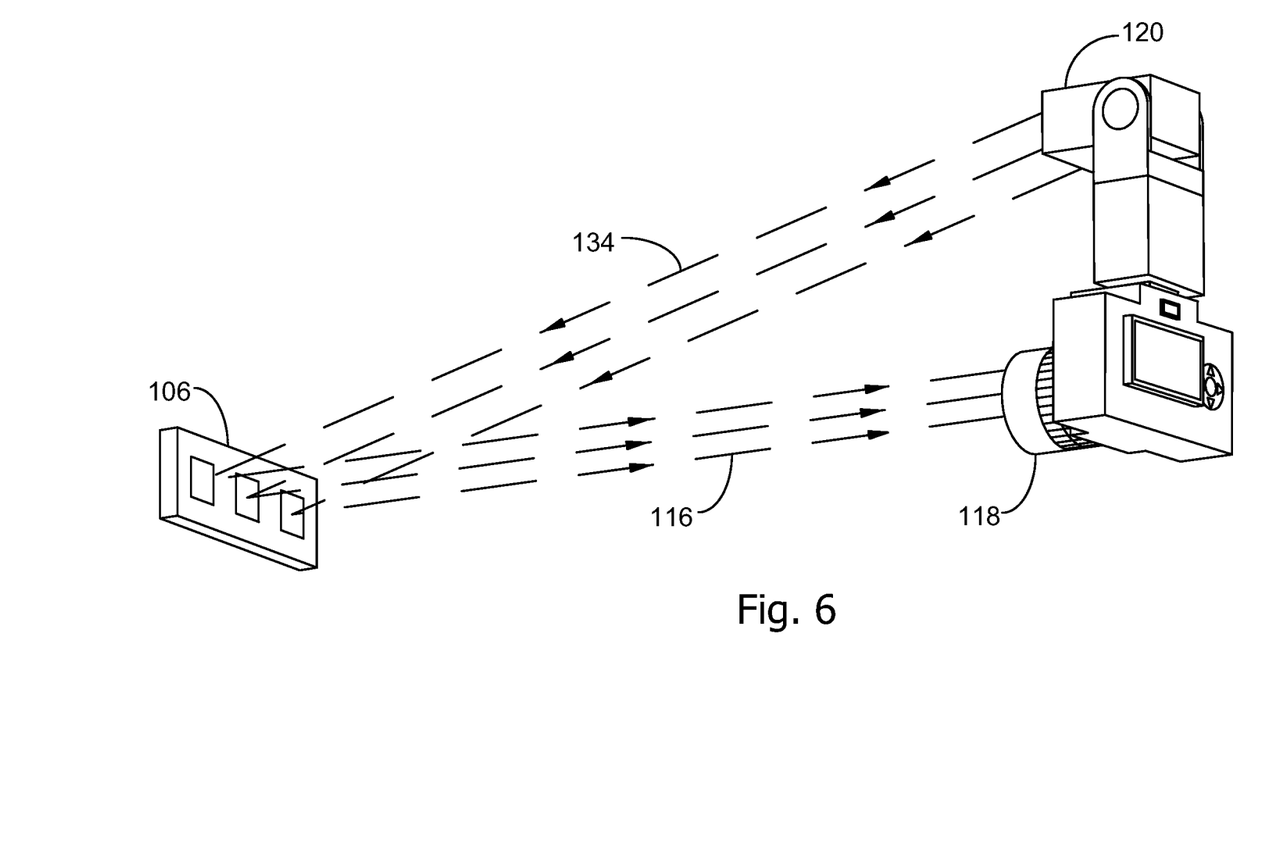
FIG. 6 shows an example of a camera and a bounce flash unit arranged for photographing a subject with direct flash illumination.

FIG. 6 illustrates an example of a flash unit with a bounce flash head 120 pointed directly at a photographic subject 106 for making a direct flash image. A plurality of lines 134 in FIG. 6 represent a direct light path for light travelling from the bounce flash head 120 to the photographic subject 106. Light reflecting from the subject 106 travels along paths 116 to the camera lens 118 as previously explained. In the example of FIGS. 3-6, flash trigger, status, and control lines for both the direct and bounce flash units pass through the hot shoe connector 132.

Operation of the embodiments of the invention may be understood in relation to the examples presented in FIGS. 7-10, which show a view toward the back side of a camera 104 having an image display 136 for displaying test images and final images captured by the camera. The image display 136 may also function as an electronic viewfinder for viewing a photographic subject before an image is captured and saved. In FIGS. 7-10, different gray shades are represented by different densities of stippling, with denser stippling representing darker grays. A black square or rectangular region represents a black (completely underexposed) region in an image, corresponding to a dark or nonreflective region on a subject. A white square or rectangular region without stippling represents a white (completely overexposed) region in an image, corresponding to a bright or highly reflective region on a subject. FIGS. 7-10 further include exemplary image manipulation controls comprising a plurality of cursor control buttons 140 for repositioning a cursor 152 on the image display 136 and a select button 142 for initiating another action after the cursor 152 has been moved to a selected position on the image display. Although the image display 136 and control buttons (140, 142) are shown on the camera 104 in the illustrated examples, these components are placed instead on the flash unit in some embodiments of the invention.

Figure 7:
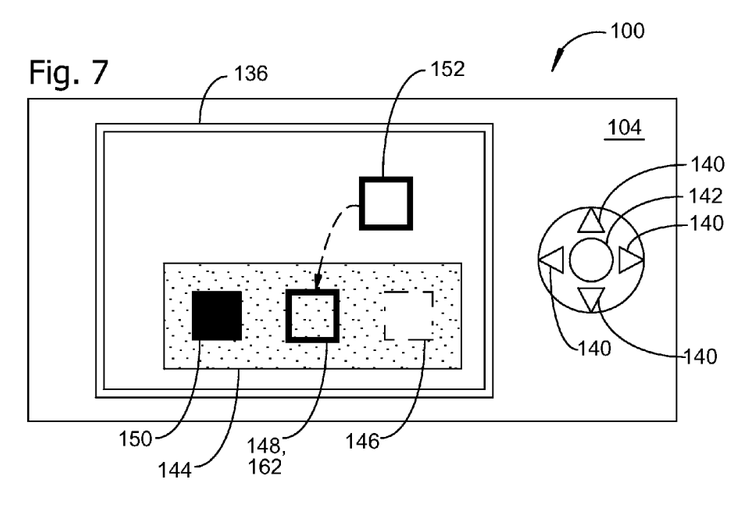
FIG. 7 illustrates an exemplary embodiment of the invention comprising a camera having a display for viewing captured imagery, and further illustrating an exemplary test image having a different value of reflectivity measured from each of several different areas in the test image.

FIG. 7 illustrates an example of a first test image, for example a direct flash test image, in which an image 144 of a photographic subject comprises a plurality of subject features (146, 148, 150), each subject feature having a different value of luminosity, black (region 150, corresponding to subject feature 150 in FIG. 2), white (region 146, corresponding to subject feature 146 in FIG. 2), or an intermediate gray (region 148, corresponding to subject feature 148 in FIG. 2). A cursor, represented in FIGS. 7-8 as a repositionable selection box 152, is moved from an initial position to a subject feature 148, thereby marking a boundary around a selected region 162 comprising an average luminosity corresponding to an intermediate gray value. Repositioning of the selection box 152 is represented by an arrow drawn with a dashed line. The selection box 152 is repositioned by depressing cursor control buttons 140. The final selected position of the box 152 may be indicated by depressing a select button 142. it will be appreciated that there are many alternative arrangements of cursor control and select buttons, compared to the exemplary arrangement in the figures herein.

Figure 8:
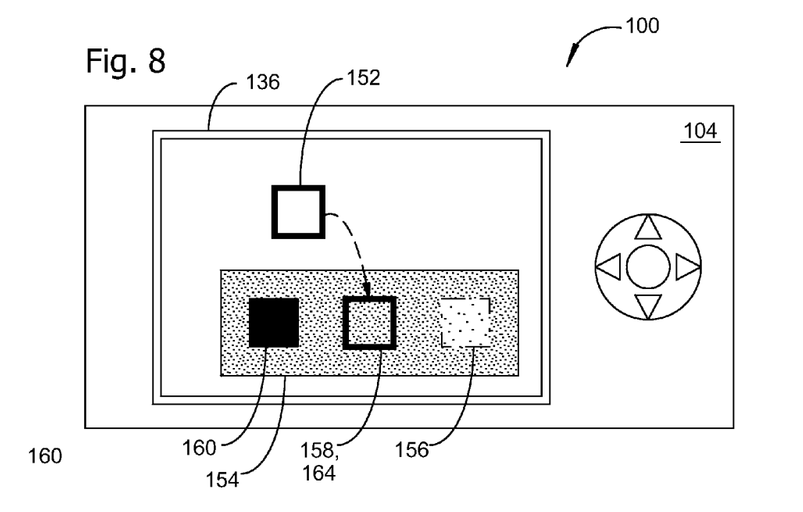
FIG. 8 continues the example of FIG. 7, showing a cursor used to select a region of interest in a new test image for comparison to the same region in the test image of FIG. 7.

FIG. 8 represents an example of an image of the same photographic subject as shown in the example of FIG. 7, but made with bounce flash illumination instead of direct flash illumination. The bounce flash image 154 of the photographic subject in FIG. 8 is represented with darker tonal values compared to the direct flash image 144 in FIG. 7. A first region 160, already black in the first test image (region 150 in FIG. 7) is also black in the second test image. A second test region (148 in FIG. 7, 158 in FIG. 8) is significantly darker in the second test image than in the first test image, as is a third region (146 in FIG. 7, 156 in FIG. 8). FIG. 8 further illustrates the selection box 152 being repositioned to highlight the same region selected in FIG. 7, with the selection box 152 being moved from its initial position to a selected region 164 in the second image. The selected region 164 bounds the same subject feature (image feature 158 in FIG. 8) selected in the first test image (image feature 148 in FIG. 7). In some embodiments of the invention, the region selected in the first test image by an expert system or by a photographer is automatically re-selected in the second test image. For example, an expert system may select a human face in the first and second test images. However, a photographer or an expert system may optionally choose to highlight different features in the first and second test images.

Figure 9:
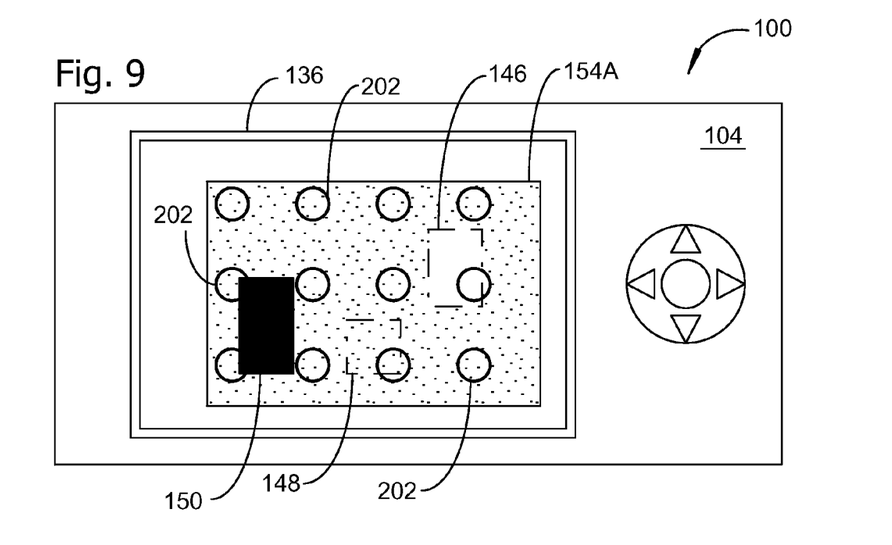
FIG. 9 illustrates an example of a camera display of a test image overlaid by symbols representing focus zones in a camera autofocus system.
Figure 10:
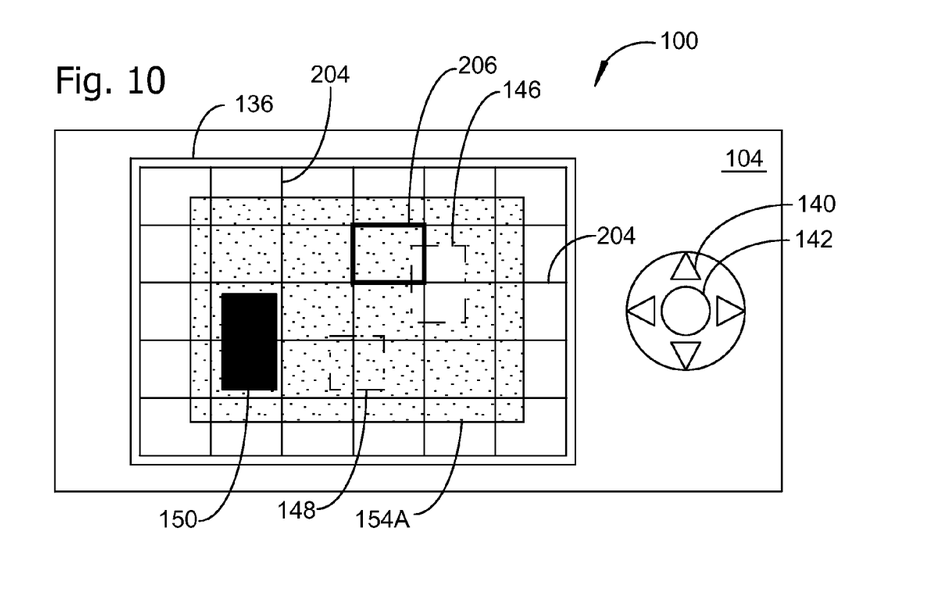
FIG. 10 illustrates an example of a camera display of a test image overlaid by a grid for identifying and selecting different zones in the test image.

FIGS. 9-10 illustrate alternative methods for identifying regions of interest in test images. Both FIGS. 9 and 10 include a same example of an image 154A of a photographic subject. The image 154A is representative of either a direct flash test image or a bounce flash test image. The image 154A in FIGS. 9-10 further includes a black region 150, corresponding to a dark or low-reflectivity area on the photographic subject, a white region 146, corresponding to a bright, highlight, or high-reflectivity area on the photographic subject, and an intermediate gray region 148. In the example of FIG. 9, the regions used for comparison of the direct flash and bounce flash images may be automatically selected from one or more zones 202 used by the camera's autofocus system. In the example of FIG. 9, there are 12 autofocus zones 202 overlaying the image 154A. The combined image area of all of the autofocus zones, or alternatively of any subset combination of selected autofocus zones, may optionally be used for comparing test images. Such a comparison could be made automatically, that is, without user input regarding image elements to be compared.

In the example of FIG. 10, a grid 204 is overlaid on the test image 154A. A repositionable selection box 206 may be moved with cursor buttons 140. A selected grid location, for example a grid location including a subject feature of interest for comparing test images, may be marked with the select button 142. Once the regions of interest have been selected in the direct flash test image and bounce flash test image, either by operating cursor control buttons 140 or automatic selection by an embodiment of the invention, the regions may be compared and an attenuation factor computed for compensation a bounce flash exposure for the final image. Alternatively, regions of interest may be determined by a flash unit, a camera, or a flash controller, instead of by a person operating the photographic equipment.

Figure 11:
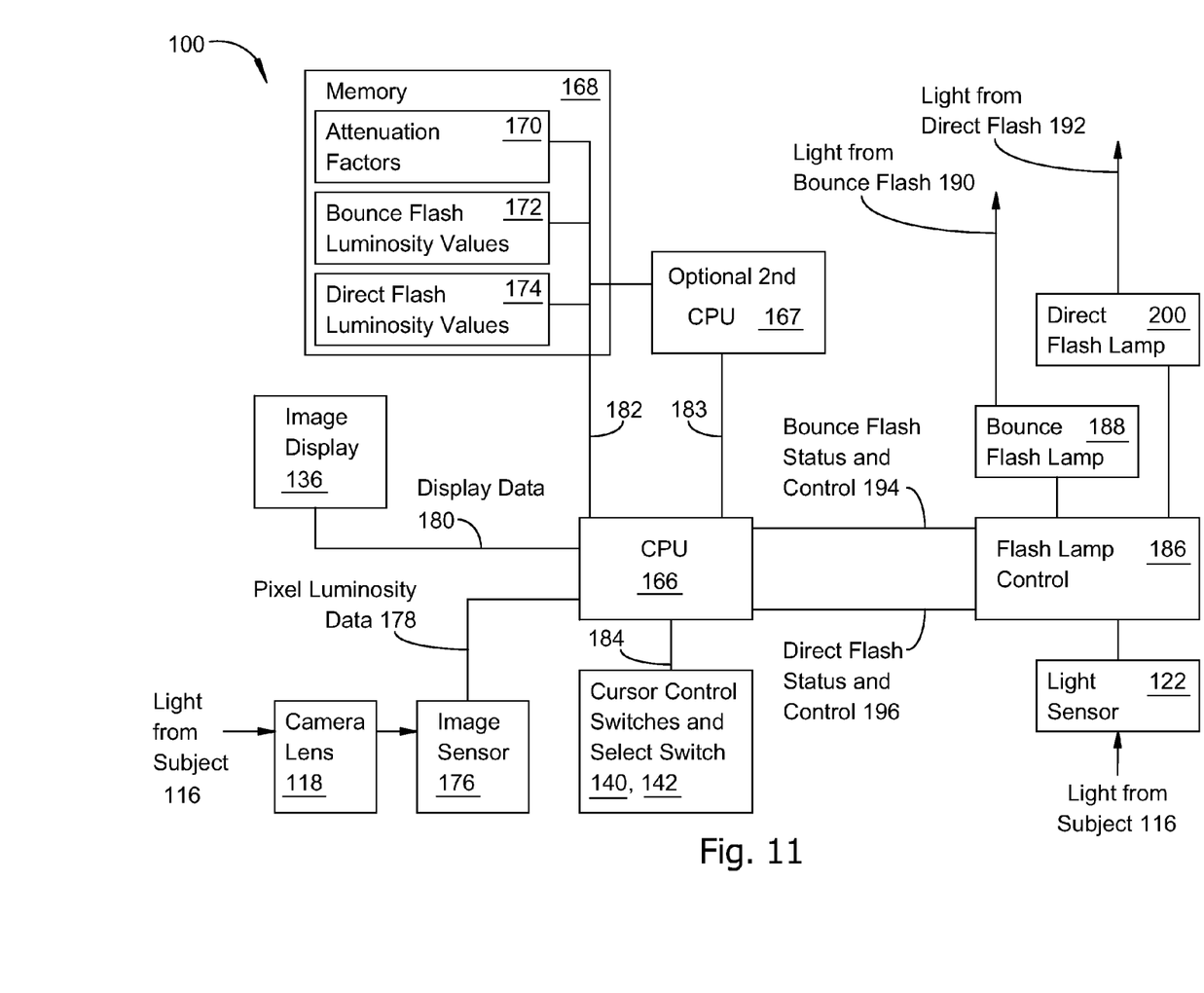
FIG. 11 illustrates an exemplary embodiment of a digital photography system comprising a digital camera, an optional bounce flash unit, and an optional direct flash unit.

FIG. 11 illustrates a simplified block diagram of an exemplary embodiment of a digital photography system for capturing two test images, comparing selected regions in each test region, and compensating a bounce flash exposure with an attenuation factor calculated from the selected regions in the test images. A direct flash lamp 200 is the light-emitting element of a direct flash unit, for example the direct flash unit 198 in FIGS. 3-5. A bounce flash lamp 188 is the light-emitting element of a bounce flash unit, for example the bounce flash head 120 in FIGS. 3-5. A flash lamp control circuit 186 drives each flash lamp independently, providing the electrical signals needed to turn each lamp on and off. The flash lamp control 186 optionally includes interface circuits for making measurements or receiving control inputs from a light sensor 122. The light sensor 122 may receive light signals from other flash units or may receive reflected light 116 from a photographic subject.

The flash lamp control circuit 186 exchanges bounce flash status and control signals for the bounce flash lamp 188 over a set of lines 194 making electrical connections to a CPU 166. Direct flash status and control signals are exchanged between the flash lamp control 186 and CPU 166 over lines 196. The CPU 166 may send trigger, flash timing, and flash intensity signals to each flash lamp independently of the other.

The CPU 166 is connected to an image display 136 by a display data bus 180. Light from a subject 116 enters a camera lens 118 which forms an image on an image sensor 176. The image sensor 176 converts the image to rows and columns of pixels displayable on the image display 136. Data for each pixel includes a value representative of image luminosity at the image location corresponding to the pixel. Luminosity data may be transferred from the image sensor 176 to the CPU 166 over pixel data lines 178 and then to a memory 168 over memory data and address lines 182. The memory 168 includes separate storage locations for direct flash image luminosity values 174, bounce flash image luminosity values 172, and attenuation factors 170 calculated from selected luminosity values. Cursor control switches 140 and a select switch are connected to the CPU 166 over a plurality of lines 184, operating as previously described to select regions of interest in the test images.

In some example embodiments of the invention, the CPU 166, switches (140, 142), memory 168, and image display 136 are part of a camera. In some example embodiments, either the direct flash lamp 200, the bounce flash lamp, or both, are part of a camera. In other example embodiments, any combination of these components may be located on a bounce flash unit capable of being removably attached to a hot shoe on a camera. In yet other example embodiments of the invention, the memory 168, and optionally a second CPU 167 in signal communication with the memory 168 over electrical connections 182 and CPU 166 over electrical connections 183, are part of an external flash control unit, for example the flash controller 328 of FIG. 1. In embodiments of the invention in which the memory 168 is not part of the camera, for example when the memory 168 is part of a flash controller or a flash unit, a second CPU 167 may optionally be provided for managing the memory 168 and performing steps in accord with method embodiments of the invention, such as determining attenuation factors as will be explained in reference to FIG. 12. A second CPU may exchange signals representative of data and commands with the CPU 166 in the camera over a set of data and command lines 183.

Figure 12:
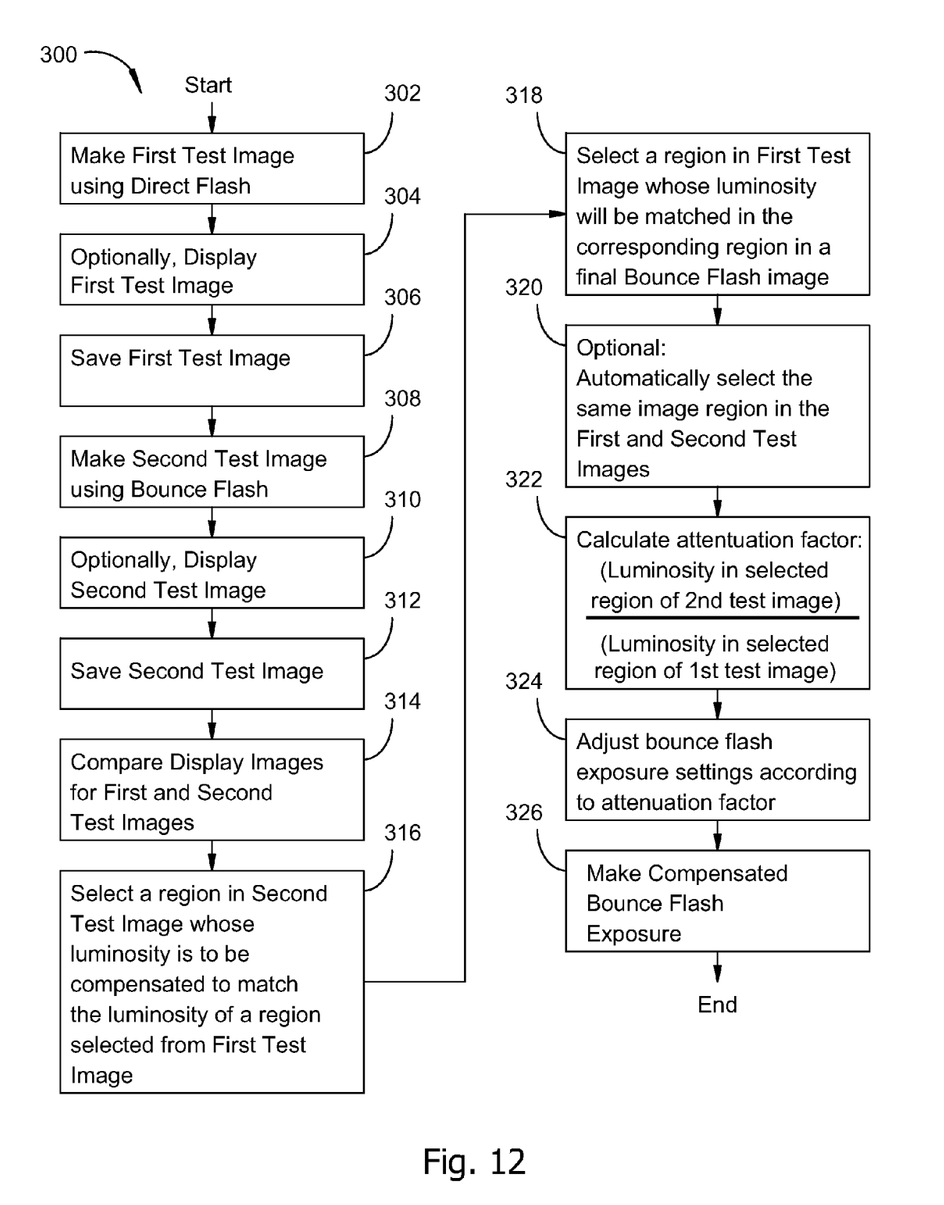
FIG. 12 illustrates steps in an exemplary method embodiment for determining an amount of compensation for a bounce flash exposure from two test exposures.
Figure 13:
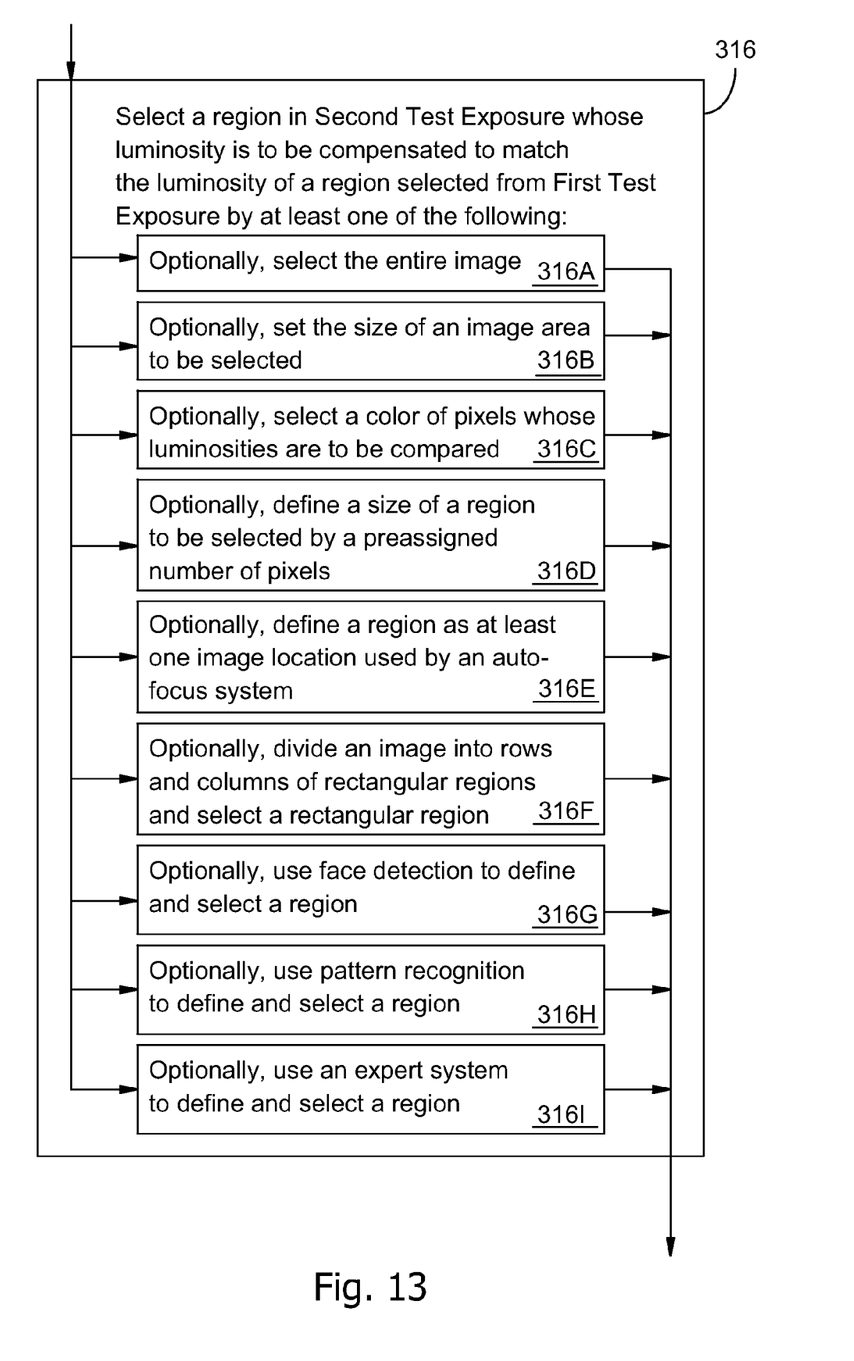
FIG. 13 continues the example of FIG. 12, showing optional method steps.
Figure 14:
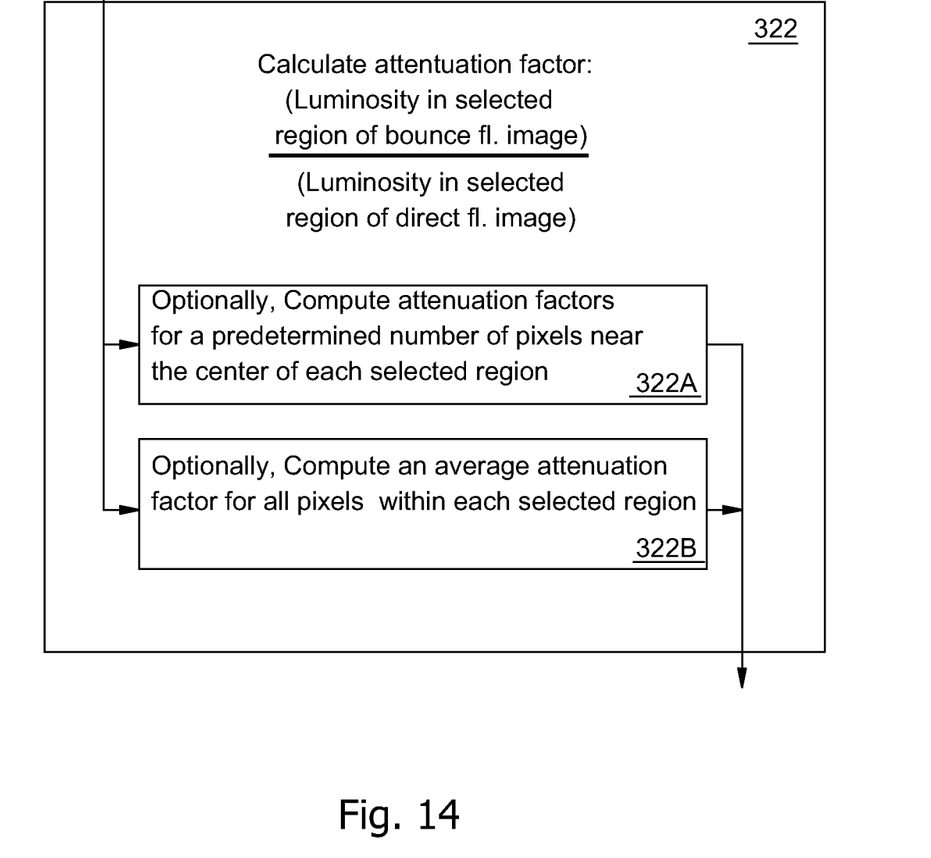
FIG. 14 continues the example of FIGS. 12-13, showing more optional method steps.

Another example of an embodiment of the invention comprises steps in a method for compensating a bounce flash exposure by making two test images and calculating an attenuation factor. FIGS. 12-14 illustrate steps in an example of a method embodiment of the invention.

In FIG. 12, an example of a method embodiment of the invention 300 begins with step 302, making a first test image using direct flash.

Next, at step 304, the first test image may be displayed. The step 304 of displaying the first test image may optionally not be performed. In step 306, the first test image is saved in memory. Saving the image refers to saving the luminosity value for each pixel in the image. Other data may optionally be saved with the pixel luminosity values.

At step 308, a second test image is made using bounce flash illumination. The bounce flash image may be displayed at step 310 and saved at step 312. The step 310 of displaying the second test image may optionally not be performed.

At step 314, the first and second test images are displayed and compared. The comparison may optionally be made by a photographer or by an expert system running in a CPU in an embodiment of the invention.

At step 316, a region is selected in the second test image, wherein a luminosity value for the selected region is to be achieved through suitable adjustment of bounce flash settings to match a luminosity value of a region to be selected from the first test image.

At step 318, a region is selected in the first test image, wherein a luminosity value for the selected region in the first test image is to be matched in the corresponding region in a final exposure.

At optional step 320, the same image region selected in the first test image is automatically selected in the second test image.

At step 322, an attenuation factor is calculated by dividing a luminosity in a selected region of the second test image by a luminosity in a selected region of the first test image.

At step 324, final bounce flash exposure output is determined by dividing bounce flash test flash output by the attenuation factor.

At step 326, a final bounce flash image is made using compensated bounce flash exposure settings.

In other example embodiments of the invention, the steps above may be rearranged so that a region may be selected first in a bounce flash test image, then in a direct flash test image.

Step 316 in FIG. 12 may include any of the following optional steps, as shown in FIG. 13:

At step 316A, select the entire test image as the region for comparing luminosities.

At step 316B, select the size of a selection box for comparison of image areas.

At step 316C, select a color of pixels whose luminosities are to be compared throughout each test image.

At step 316D, define a size of a region to be selected as corresponding to a preselected number of image pixels.

At step 316E, define a region for comparison between test images as comprising at least one image location used by an autofocus system.

At step 316F, divide a test image into rows and columns of rectangular regions and select a particular rectangular region for comparison. For purposes of this step, a square is considered to be a form of rectangle.

At step 316G, use face detection to define and select a region.

At step 316H, use pattern recognition to define and select a region.

At step 316I, use an expert system to define and select a region.

Step 322 in FIG. 12 may include any of the following optional steps, as shown in FIG. 14:

At step 322A, compute attenuation factors for a predefined number of pixels near the center of each selected region.

At step 322B, compute an average attenuation factor for all pixels within a selected region.

In each of the preceding examples, a direct flash test image preceded a bounce flash test image. It will be appreciated that any of the disclosed embodiments of the invention may be operated in the reverse order, that is, the bounce flash test image may be made first and the direct flash test image second.

Those skilled in the art will appreciate that various adaptations and modifications can be configured without departing from the scope and spirit of the embodiments described herein. Therefore, it is to be understood that, within the scope of the appended claims, the embodiments of the invention may be practiced other than as specifically described herein.

What is claimed is:

1. An apparatus comprising:
    a direct flash unit;
    a bounce flash unit rotatably connected to said direct flash unit;
    a first plurality of status and control lines for controlling triggering and flash timing for said bounce flash unit;
    a second plurality of status and control lines for controlling triggering and flash timing for said direct flash unit;
    a hot shoe for attachment to a camera, wherein said first and second pluralities of status and control lines are electrically connected from each of said direct and bounce flash units to said hot shoe;
    a memory for storing bounce flash luminosity factors for each pixel in a bounce flash test image;
    a memory for storing direct flash luminosity factors for each pixel in a direct flash test image;
    a memory for storing attenuation factors calculated from said bounce flash luminosity factors and said direct flash luminosity factors; and
    a central processing unit for calculating said attenuation factors and compensated flash exposure settings.

2. The apparatus of claim 1, further comprising:
    a digital camera electrically connected to said direct flash and said bounce flash through said hot shoe.

3. A digital photography system, comprising:
    a direct flash unit;
    a bounce flash unit;
    a flash controller comprising:
        a memory for storing bounce flash luminosity factors for each pixel in a bounce flash test image;
        a memory for storing direct flash luminosity factors for each pixel in a direct flash test image;
        a memory for storing attenuation factors calculated from said bounce flash luminosity factors and said direct flash luminosity factors; and
        a central processing unit for calculating said attenuation factors and compensated flash exposure settings.

4. A method performed by a processing device comprising the steps of:
    generating a first test image using a digital camera;
    generating a second test image using the digital camera;
    selecting a region in the first test image;
    selecting a region in the second test image;
    computing a luminosity value for the region in the first test image;
    computing a luminosity value for the region in the second test image;
    computing an attenuation factor from the luminosity values for the first and second test images;
    dividing a selected control setting for a bounce flash unit by the attenuation factor to form a compensated control setting; and
    generating a final image using the digital camera and the compensated control setting.

5. The method of claim 4, wherein the step of generating a first test image further includes using direct flash illumination of a photographic subject.

6. The method of claim 5, wherein the step of generating a second test image further includes using bounce flash illumination of a photographic subject.

7. The method of claim 6, wherein the step of computing an attenuation factor further comprises computing an average value of attenuation for all pixels in the selected region in the first and second test images.

8. The method of claim 6, wherein the step of computing an attenuation factor further comprises computing an average value of attenuation for pixels near the center of the selected region in the first and second test images.

9. The method of claim 6, wherein the step of selecting a region in the first test image comprises the steps of:
    displaying the first test image;
    displaying a repositionable cursor overlaid on the first test image; and
    selecting an image region with the repositionable cursor.

10. The method of claim 6, wherein the step of selecting a region in the second test image comprises the steps of:
    displaying the second test image;
    displaying a repositionable cursor overlaid on the second test image; and
    selecting an image region with the repositionable cursor.

11. The method of claim 6, wherein the step of selecting a region in the first test image comprises the step of selecting at least one autofocus zone as the region in the first test image.

12. The method of claim 11, further comprising a step of selecting a combination of more than one autofocus zones as the region in the first test image.

13. The method of claim 6, wherein the step of selecting a region in the first test image comprises the steps of:
dividing the test image into rows and columns of rectangular areas;
advancing a cursor over the rectangular areas until the cursor overlays a selected subject feature in the image; and
selecting the row and column location overlaid by the cursor.

14. The method of claim 6, wherein the step of computing a luminosity value for the region in the first test image comprises calculating an average value of luminosity for all pixels in the selected region of the first test image.

15. The method of claim 6, wherein the step of computing a luminosity value for the region in the second test image comprises calculating an average value of luminosity for all pixels in the selected region of the second test image.

16. The method of claim 6, wherein the region selected in the second test image is automatically selected to correspond to the position of the region selected from the first test image.

17. The method of claim 6, further comprising a step of defining a size of a region to be selected as a preassigned number of pixels.

18. The method of claim 6, further comprising a step of setting the size of a region to be selected.

19. The method of claim 6, further comprising a step of selecting a color of pixels whose luminosities are to be compared in the first and second test images.

20. The method of claim 6, further comprising a step of reviewing a bounce flash test image to identify an image location having luminosity values to be adjusted to match luminosity values of pixels in a corresponding image location from a direct flash exposure.

\* \* \* \* \*